Figure 1:
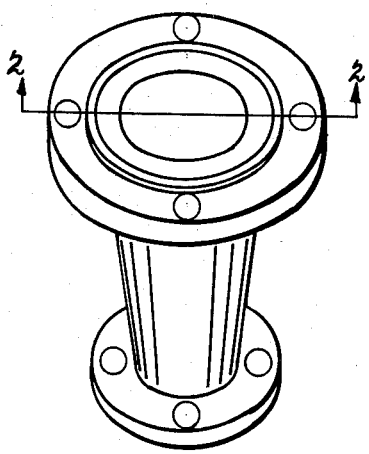

March 14, 1961 M. E. GINAVEN ET AL 2,974,684
REINFORCED MOLDED CONE
Filed Nov. 25, 1955 2 Sheets-Sheet 1

INVENTOR.
MARVIN E. GINAVEN
MAURICE D. WOODRUFF
BY Tom Walker

March 14, 1961  M. E. GINAVEN ET AL  2,974,684
REINFORCED MOLDED CONE

Filed Nov. 25, 1955　　　　　　　　　　　　　　　2 Sheets-Sheet 2

INVENTOR.
MARVIN E. GINAVEN
MAURICE D. WOODRUFF
BY
Tom Walker

United States Patent Office 2,974,684
Patented Mar. 14, 1961

2,974,684

REINFORCED MOLDED CONE

Marvin E. Ginaven and Maurice D. Woodruff, Springfield, Ohio, assignors to The Bauer Bros. Company, Springfield, Ohio, a corporation of Ohio Filed Nov. 25, 1955, Ser. No. 548,921

2 Claims. (Cl. 138—64)

This invention relates to a new and improved reinforced, molded element. More particularly, the invention relates to a means of providing improved centrifugal type cleaners by integrally molding a plastic liner to a metal base so as to afford a lasting bond therebetween. A more durable and economical cleaner is thereby produced.

The art of centrifugal cleaners has been developed to a high degree in recent years. However, a major problem has existed in the fact trat the metal cleaner elements employed have necessarily required a liner to provide corrosion and abrasion resistance to the operating surface thereof. To date, the use of a metal which would afford the required corrosion and abrasion resistance is prohibitive in cost. In the search for an economical but adequate liner for the metal base element, it was found that a plastic lining on the operating surface of the metal base element afforded satisfactory corrosion and abrasion resistance characteristics. But, in using a plastic liner adhesively bonded to the metal base element, the adhesive bond has been found unsatisfactory. The stress and pressure developed in the operation of plastic lined centrifugal cleaners causes the adhesively bonded liner to blister and separate from the base element. This results in a substantial reduction in life expectancy of the liner and quick deterioration thereof. A serious maintenance problem thereby arises interfering with cleaner efficiency and substantially increasing the operating cost.

The present invention provides an improved, simply formed element wherein a plastic liner is molded to a metal base element having the desired configuration so as to provide a positive and lasting bond therebetween. A reinforced molded element is thereby produced which is more durable and economical than any heretofore provided.

The object of the invention is to simplify the construction as well as the means and mode of operation of plastic lined elements, whereby such elements may not only be economically manufactured, but will be more efficient and satisfactory in use, adaptable to a wide variety of application, and be unlikely to get out of repair.

A further object of the invention is to provide a new and improved reinforced, molded cleaner device.

Another object of the invention is to provide a cleaner element consisting of a metal base having a plastic liner integrally molded thereto in a positively bonded manner.

A further object is to provide a centrifugal cleaner which is both corrosion and wear resistant and economical to manufacture.

Another object of the invention is to provide a new and improved centrifugal cleaner device consisting of a conical metal base element having a woven wire netting welded to the inner operating surface thereof and a plastic liner molded thereto so as to interlock with said netting and thereby positively be bonded to the base element.

An additional object of the invention is to provide a new and improved centrifugal cleaner apparatus comprising a formed metal element of a perforated nature, molded into a plastic body which interlocks over the metal element and through the perforations therein to provide a positive and lasting bond between a corrosion and wear resistant surface and the metal element.

A further object of the invention is to provide a reinforced molded element possessing the advantageous structural features, the inherent meritorius characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Figure 2:
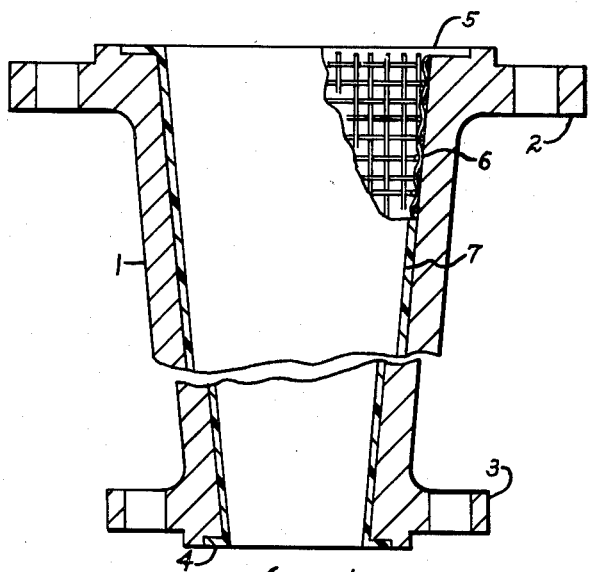
Figure 3:
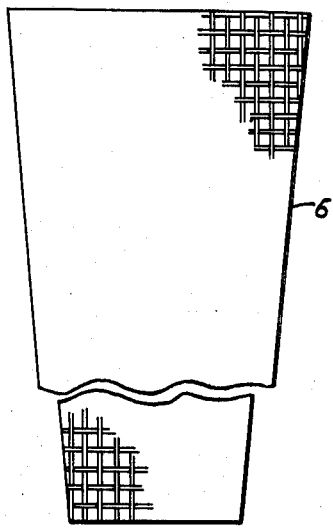
Figure 4:
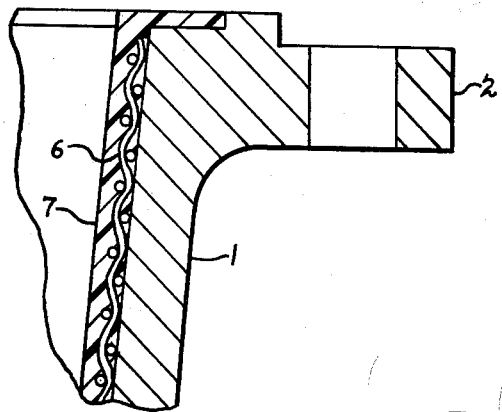
Figure 6:
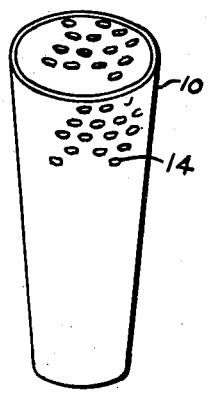
Figure 5:
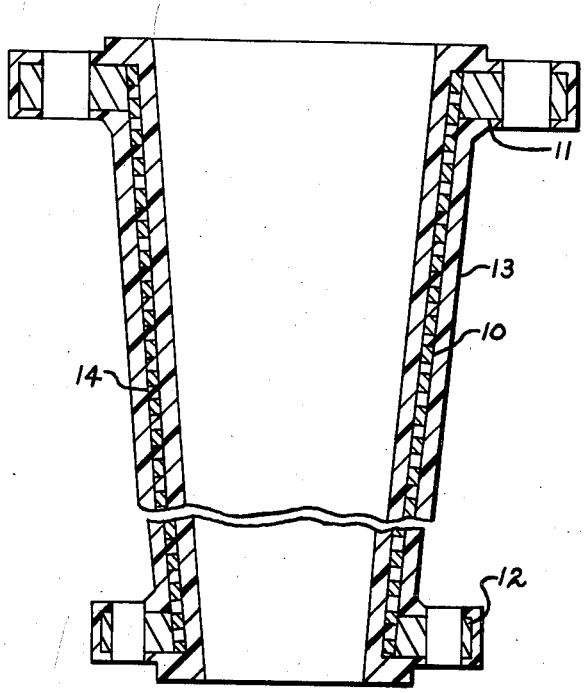

Referring to the accompanying drawing wherein is shown one but obviously not necessarily the only form of embodiment of the invention, Fig. 1 is a perspective view of a reinforced molded centrifugal cleaner fabricated in accordance with the invention, Fig. 2 is a cross-sectional view of the cleaner as shown in Fig. 1, partially broken away to show the construction detail thereof, Fig. 3 is a view of the woven wire reinforcement device employed in the modification of the invention shown in Fig. 2, Fig. 4 is a fragmentary sectional view of the apparatus of Fig. 2 showing the detail of the bonding of the plastic liner to the conical cleaner element therein, Fig. 5 is a cross-sectional view showing a modification of the invention as presented in Fig. 2, and Fig. 6 is a view of the perforated base member employed in the modification shown in Fig. 5.

Like parts are indicated by similar characters of reference throughout the several views.

The invention can best be described with reference to the drawings. A practical embodiment thereof, shown in Fig. 2 of the drawings, is formed on a conical member 1, preferably fabricated of cast iron. The conical member 1 has radial flanges 2 and 3 connected therewith adjacent the open extremities thereof. The ends 4 and 5 of the conical member 1 are recessed about the opening therethrough. Such construction permits the joining of several sections to form a complete cleaner, each joint being sealed by the interfitting engagement of the next adjacent section.

A conically formed netting 6 of woven wire cloth is then applied to the inner surface of the conical member 1 so as to completely overlie such surface. The woven wire unit 6 is preferably welded in fixed relation to the inner surface of the member 1 in a manner to become a part thereof. The conical structure thus effected is then placed in a mold and a plastic liner 7 is molded thereto over the inner surface thereof. In the molding process the plastic material forming the liner 7 flows over and through the woven wire reinforcement unit 6 to interlock therewith and to the conical member 1 thereby. In this manner the plastic is positively bonded to the conical member 1 in a simple fashion to provide a corrosion and wear resistant liner integrally molded thereto.

As illustrated, this method for producing centrifugal cleaners provides that the operating surface of the conical base element 1 be interconnected with a woven wire connecting means 6 and a plastic liner 7 integrally molded thereto. A highly improved and lasting bond is thereby provided between the plastic liner 7 and the base element 1. A plastic surface is thereby formed on the metal cleaner element 1 which is not only corrosion and abrasion resistant but also blister proof so as to maintain its integral connection to the metal base member 1 at all times. This not only provides a durable and economical cleaner but also results in a considerable reduction in maintenance cost of such cleaners.

With reference to the embodiment of the invention illustrated in Figs. 5 and 6 of the drawings, this modification includes a conical base member 10 of perforated sheet metal. The open extremities of this conically formed perforated sheet are provided with radially extending flanges 11 and 12 welded thereto. The perforated cone and attached flanges are then placed in a mold and plastic material introduced to form a complete inner and outer liner 13 about the flanged cone 10. In the molding process the plastic flows through the perforations 14 in the conical member 10 to interlock therethrough and thereabout.

This modification of the invention provides an improved cleaner element including a positively interlocked plastic liner completely molded thereto. The base element 10 affords the strength and the plastic liner provides complete corrosion and abrasion resistance in the use of the device as a centrifugal cleaner. So constructed, the liner will not separate from the base element.

Thus, a highly improved cleaner element is provided, having the advantage of a positive bond between a plastic liner and a relatively inexpensive metal base element. A durable, efficient and highly economical cleaner element results. While the invention is particularly advantageous in forming improved, economical centrifugal cleaners, those versed in the art will readily recognize other advantageous applications thereof which are within the contemplation and scope of the invention.

From the above description it will be apparent that there is thus provided a device of the character described possessing the particular features of advantage before enumerated as desirable, but which is obviously susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein described comprise the preferred forms of the several modes of putting the invention into effect, and the invention is therefore claimed in any of its forms or modifications within the legitimate and valid scope of the appended claims.

Having thus described our invention, we claim:

1. A centrifugal cleaner unit comprising a hollow conical metal base member, said member having open ends, flanges connected to said member adjacent said ends and extending radially outwardly, a smaller cone shaped element of open work metal welded in co-extensive abutting relation to the inner surface of said hollow base member, and a liner of corrosive and abrasive resistant plastic bonded in contacting relation to said inner surface of said base member, said liner covering said open work metal element and further bonding said open work metal element to said inner surface of said conical base member.

2. A centrifugal cleaner unit comprising a hollow conical metal base member, said base member having open ends, flanges connected to said member adjacent said ends and extending radially outwardly, lateral recesses at the top and bottom of said base member between the opening through the base member and the outer edges of said flanges, a smaller conical element of open work metal welded in abutting relation to the inner surface of said base member, and a corrosive and abrasive resistant liner of plastic bonded to the inner surface of said base member and in and about the open metal element, said open work metal element being completely covered by the plastic liner, said plastic liner further bonding said conical element of open work metal to the inner surface of said base member.

References Cited in the file of this patent

UNITED STATES PATENTS

| | | |
|---|---|---|
| 1,280,909 | Wales et al. | Oct. 8, 1918 |
| 1,302,744 | Whitford | May 6, 1919 |
| 1,396,934 | Judd | Nov. 15, 1921 |
| 1,468,519 | Seabrook | Sept. 18, 1923 |
| 1,505,801 | Peterson | Aug. 19, 1924 |
| 1,540,563 | Oliver | June 2, 1925 |
| 1,606,680 | Wisner | Nov. 9, 1926 |
| 1,767,421 | Wirth | June 24, 1930 |
| 1,784,780 | Bronson | Dec. 9, 1930 |
| 1,960,042 | Andrus | May 22, 1934 |
| 2,690,411 | Seymour | Sept. 28, 1954 |
| 2,734,681 | Schmiedel | Feb. 14, 1956 |
| 2,779,469 | Harris | Jan. 29, 1957 |
| 2,787,374 | Krebs | Apr. 2, 1957 |
| 2,816,658 | Braun et al. | Dec. 17, 1957 |